United States Patent
Coon et al.

(10) Patent No.: US 6,738,892 B1
(45) Date of Patent: May 18, 2004

(54) USE OF ENABLE BITS TO CONTROL EXECUTION OF SELECTED INSTRUCTIONS

(75) Inventors: Brett Coon, Milpitas, CA (US); David Keppel, Seattle, WA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/421,615

(22) Filed: Oct. 20, 1999

(51) Int. Cl.⁷ .............................................. G06F 15/80
(52) U.S. Cl. ......................... 712/24; 712/219; 712/244
(58) Field of Search ........................ 712/24, 244, 219

(56) References Cited

U.S. PATENT DOCUMENTS

| | | | | |
|---|---|---|---|---|
| 5,325,495 A | * | 6/1994 | McLellan | 712/219 |
| 5,418,970 A | * | 5/1995 | Gifford | 712/20 |
| 5,555,429 A | * | 9/1996 | Parkinson et al. | 712/22 |
| 6,041,399 A | * | 3/2000 | Terada et al. | 712/24 |

OTHER PUBLICATIONS

Hennessy, John L. et al., Computer Architecture A Quantitative Approach, 1996, Morgan Kaufmann Publishers, Inc., 2nd Ed., pp. 130 and 284–289.*

Ozer et al., A Fast Interrupt Handling Scheme for VLIW Processors, Oct. 12–18, 1998, Proceedings of International Conference on Parallel Architectures and Compilation Techniques, pp. 136–141.*

Patterson et al.; "Computer Architecture a Quantitative Approach"; Morgan Kaufmann Publisers, Inc.; 2nd Edition, San Francisco, CA; 1990.

* cited by examiner

*Primary Examiner*—Richard L. Ellis
*Assistant Examiner*—Tonia L. Meonske (57) ABSTRACT

An information control pipeline (13) parallels the processor's instruction pipeline (3), contains digital control information in respect of the instruction placed in the instruction pipeline and accompanies that instruction until all component operations prescribed within the instruction have been executed. When at the end of the pipeline, the instruction is presented for execution to a respective functional execution unit (7) of the processor, the respective functional execution unit accesses and uses the control information as a condition to instruction execution. Depending upon the processor, the control information may contain one or more bits, referred to as enable bits, as may be set enabled, indicating that an associated operation in the instruction is to be executed, or by software set disabled, indicating that the associated operation is masked, such as by an exception handler (9) when returning from a resolved exception.

15 Claims, 3 Drawing Sheets

USE OF ENABLE BITS TO CONTROL EXECUTION OF SELECTED INSTRUCTIONS

FIELD OF THE INVENTION

The present invention relates to digital computers, and, more particularly, to a novel method and apparatus for increasing the speed with which a micro-processor handles excepted instructions during program execution.

BACKGROUND

A digital computer includes a central processing unit, such as a microprocessor, several types of memory, input-output devices and the like. The operation of a computer is controlled by computer programs, such as operating systems and application programs. Those programs provide instructions to those functional units of a central processor responsible for handling and execution as binary information. Different binary sequences represent different instructions for a particular machine and the instructions tend to be peculiar to a particular processor or processor family. Thus, typically, different families of processors have different instruction sets, unless they are specifically designed to utilize an instruction set of another processor family.

The instructions of one processor typically cannot be understood directly by any of the other types of processors. The difference in instruction sets is often due to the format chosen by the designer for presenting instructions to the processor. In general, a designer may chose to design a processor for a complex instruction set computer (CISC) or reduced instruction set computer (RISC) or for a newer very long instruction set (VLIW) computer.

CISC processors provide special hardware for executing an entire operation. For example, an ADD instruction may provide one operand to an integer unit register, fetch a second operand from memory and place it in a second register, and combine the two operands in a third register. Because it does so, instruction formats are very complicated. Such structure takes a large amount of hardware and processing effort to tell one instruction from another.

A RISC processor, on the other hand, is much simpler and treats each part of an ADD operation as a separate element. By providing consistently sized instructions, a RISC processor eliminates significant hardware and reduces the processing time needed to decode instructions.

A newer type of processor called a very long instruction word (VLIW) processor attempts to make use of the best attributes of both CISC and RISC. It uses consistent sized instructions (herein called "atoms") as do RISC processors, but groups a number of those instructions together in a VLIW word (herein called a "molecule") and provides processing units to execute the individual atoms in parallel.

The execution of most operations by a processor requires a number of steps. For example, instructions must be fetched from memory, sometimes a second instruction must be fetched from memory, the instruction is decoded and finally it is executed. This takes a number of operational cycles of the processor. In order to produce results as fast as possible, computers are designed so that each sequential instruction is begun (as far as is possible) on the next operation cycle after the preceding instruction has already begun the steps leading to its execution. This causes the steps leading to execution of subsequent instructions to overlap. In this manner, an instruction may often be executed each cycle.

The manner in which this starting and carrying out the steps leading to the execution of instructions so that an instruction executes each operation cycle is referred to by those skilled in the art as an instruction pipeline, which is included within processors. In operation to process an application program, the instructions of the application are serially entered into the pipeline by a pipeline control unit. The pipeline control unit includes a program counter, that loads instructions in a serial order into the pipeline.

Instructions do not always execute in the ideal order provided by the pipeline. Often things happen which interfere with the process. For example, a memory page at which an instruction resides cannot be found in main memory, creating an exception. To resolve that exception, the memory page must be paged in before the instruction can execute. Exceptions, such as the foregoing, occur for a wide variety of reasons. When such exception occurs, further internal processing activity of the application program is temporarily halted, until that exception is resolved. The excepting functional unit issues a stop signal, herein called a "kill" signal, which pauses all other functional units in the microprocessor, until the exception is resolved, empties the pipeline of any instructions and immediately prompts an exception handler into action.

The exception handler fixes the problem which has arisen. An exception handler is a software routine conventionally designed to deal with such exceptions; and different exception handlers (i.e., different routines) are prepared to handle each different kind of exception. Thus, every computer contains a library of such software handlers in its associated memory. The pipeline control unit calls up an appropriate exception handler and executes that routine.

As an example, if a memory exception is due to the failure to locate data referenced by a load instruction within main memory, the exception handler is one that pages in that data and then returns back to the original excepted instruction. Processing of the application recommences with re-execution of the same instruction. However, this time the instruction is executed without generating that memory exception. In rare instances an exception handler of a RISC or CISC processors may emulate the instruction that caused the exception and then execute the emulated instruction to achieve the result desired. In other instances, an exception handler may only note that an exception occurred and return control to the excepted instruction or may decide to skip the excepted instruction and have execution resume at the next instruction. The exception handler thereafter returns control to the instruction pipeline controller by issuing a "return-from-exception" (RFE) signal. The latter signals the pipeline counter in the pipeline control unit to reissue and execute the instruction that was subject to the exception or, alternatively as called for by the exception handler, signals to advance the next instruction into the pipeline, that is, insert the memory address of the succeeding instruction into the pipeline, thereby moving pipeline activity beyond the instruction that generated the exception. In either event, the return-from-exception procedure is a very simple step.

Such a simple step of skipping past an excepted instruction is not possible for VLIW processors. In VLIW processors it is frequently desired for exception handlers to emulate an excepting instruction. Although re-execution of the excepting atom instruction is not desired, other instructions in the VLIW instruction must be executed. For example, one VLIW computer system is described U.S. Pat. No. 5,832, 205 to Kelly et al, granted Nov. 3, 1998, entitled, Memory Controller For A Microprocessor For Detecting A Failure of Speculation On The Physical Nature of A Component Being Addressed (the "205 Kelly patent"), assigned to Transmeta Corporation, assignee of the present invention, the content of which patent is incorporated by reference herein in its entirety. The present invention has particular application to VLIW computers, and, in particular, to VLIW computers described by the '205 Kelly patent, although it should be understood that the invention may be found to also be applicable to other types of computers.

The '205 Kelly patent discloses a novel microprocessor formed by a combination of hardware processing portion, much simpler in structure than competitive prior state of the art microprocessors, and an emulating software portion, referred to therein as "code morphing software". Among other things, in the Kelly system the code morphing software carries out a significant portion of the functions of processors in software, thereby reducing the hardware required for processing and the greater electrical power that such hardware requires. For a better understanding of the foregoing and other functions accomplished by the code morphing software, the interested reader is invited to study the '205 Kelly patent.

A VLIW processor constructed in accordance with the '205 Kelly patent also contains an instruction pipeline. However, because a VLIW instruction ("molecule") is packed with a number of individual instructions ("atoms"), which are to be executed in parallel, what is generally referred to as the instruction pipeline in a processor prescribed in the '205 Kelly patent is actually a composite of multiple parallel pipelines. The stages of the instruction pipeline in the latter processor number, typically, five. Those stages comprise, as example, first and second stages (cycles) to fetch an instruction from an instruction cache, two register operations and, ultimately, the execution stage, at which an instruction is executed (or is found subject to an exception).

The pipeline formatting of a molecule rarely contains a single atom prescribing an operation, but, typically, comprises two and as many as four separate atoms prescribing different operations. All those atoms pass along the instruction pipeline as a collective group constituting the molecule. Since individual atoms are intended to be executed by separate functional units and execute in parallel, i.e., simultaneously, the VLIW processor comprises multiple instruction pipelines, one for each functional unit in the computer that may be called upon during the processing steps to execute atom instructions. In making reference herein to the VLIW processors pipeline, it should be understood that reference is being made collectively to the multiple pipelines, unless the context of the statement indicates that reference is made only to a specific individual pipeline, as example, to the memory pipeline, the ALU1 pipeline and so on.

At the respective pipeline's execution stage, the atomic instructions are executed by separate non-conflicting functional units in the computer, ideally concurrently for optimal speed of processing. If execution of one of those component instructions causes an exception, which, as a consequence, halts further application processing and forces clearance of the instruction pipeline, as many as three atomic instructions in the VLIW molecule are also halted and cleared from their respective instruction pipelines.

In VLIW computers an exception handler cannot simply advance the pipeline control unit's instruction counter another step, as occurs in the prior CISC computers as earlier described, since the remaining operation atoms in the same molecule also must be accounted for and require execution. Instead the VLIW computers exception handlers are required to either emulate all the atoms in the molecule before returning control back to the pipeline control unit or otherwise store, retrieve and execute those remaining atoms.

The foregoing exception handling process is very expensive in terms of VLIW processor time (clock cycles) and is likely to dramatically slow execution of the program. It also requires the software comprising the exception handlers to be significantly more complex than that for the CISC type processors. Neither result is attractive. Both detract from inherent advantage of the VLIW processor.

The present invention offers a better approach for handling those atoms in the event of an exception. As an advantage VLIW computers, such as those constructed in accordance with the '205 Kelly patent, are no longer required to increase the complexity of exception handling software to account for and/or handle the other atoms in the VLIW molecule. As a further advantage, the invention permits continued reassertion of a VLIW instruction (molecule) that generated the exception within the execution pipeline for execution of remaining atomic instructions within the molecule by disabling the atom (or atoms) responsible for the exception (or exceptions), permitting the remaining atoms to execute. A VLIW molecule is repeatedly asserted into the pipeline until all the individual atoms within the molecule have been executed or excepted.

Accordingly, an object of the invention is to improve the internal operating efficiency of a microprocessor, more particularly, a VLIW microprocessor.

A further object of the invention is to provide a new more efficient process and apparatus internal to a VLIW microprocessor for handling atoms in a molecule (VLIW instruction), both those atoms responsible for generating an exception and the remaining atoms, that ensures that any atom requiring execution is executed.

A still further object of the invention is to minimize the time (system clock cycles) required to process a VLIW instruction in the event the instruction is responsible for an exception.

And an ancillary object of the invention is to reduce the need for complex exception handling software in those computers that execute complex instructions, defining multiple independent operations there within, and permit use of exception handling software of the complexity level inherent in those computers which execute ordinary instructions.

SUMMARY OF THE INVENTION

In accordance with the foregoing objects and advantages, the improved VLIW processor defined by the invention provides a separate information control pipeline to parallel the instruction pipeline. The control information pipeline is provided with control information about the VLIW instruction that was input into the instruction pipeline. That control information accompanies that VLIW instruction until all the component operations prescribed in the VLIW instruction have been executed, effectively linking the control information with the corresponding VLIW instruction. When the atoms within a VLIW instruction are presented for execution to the respective functional execution units of the processor, the respective functional units are able to access and use that control information.

In a more specific aspect to the invention, the respective functional unit determines whether the atom that is presented for execution is to be executed or masked.

In accordance with a more specific aspect to the invention, the control information, defining an instruction pipeline control packet for the VLIW processor, comprises extra bits, herein referred to as "enable bits". Each enable bit is associated with a respective one of the plurality of different functional units of the processor responsible for executing an atom (operation), such as the memory unit, Arithmetic and Logic units, the floating point unit and the like. The enable bits permit software to specify which parts of a VLIW instruction are subsequently to be executed (enabled) and which parts are to be masked (disabled) when returning from an exception. The VLIW instruction may then be reasserted in the instruction pipeline for execution of the unmasked atoms.

In accordance with the latter, the VLIW processor includes a pipeline control unit that includes a source to generate the enable bits and link those bits to a VLIW instruction; an instruction pipeline for the VLIW instruction; and an enable bit pipeline or "sideband" pipeline through which the enable bits are advanced in synchronism with the instruction's step-by-step advance through the instruction pipeline. The pipeline control unit further includes a register, herein referred to as the error register, for saving both instruction address of a VLIW instruction that is subject to an exception and the companion enable bits linked thereby. The latter register serves within the control unit as an alternate supply of the enable bits that the control unit's source provides. Each functional unit's decode logic is expanded to first decode and interpret the respective enable bit and some of the processor's exception handler's are modified to carry out the additional task of modifying the respective enable bit, changing that bit from enabled to disabled when appropriate.

The group of enable bits, one per computational pipeline, thereby tracks or follows each VLIW instruction as it is executed. By default, all the enable bits associated with each VLIW instruction are set, that is, enabled, resulting in the normal execution of all operations specified by the multiple atom instructions in the VLIW molecule. If an exception or interrupt occurs during the execution of an individual instruction (atom) contained in the VLIW molecule, the pipeline control units saves both the instruction address of the molecule and the accompanying group of enable bits in the error register. The exception handler called up to handle the exception is free to modify any of those enable bits. The exception handler can change the state of each from enable to disable (or vice-versa, if desired).

Should the exception handler for any reason determine to disable an atom that was subject to an exception, the bit associated with that atom is disabled. Upon resolving the exception, the exception handler issues a return-from-exception ("RFE") instruction, which returns control via the pipeline control unit to the original molecule. The pipeline control unit restarts the same VLIW molecule instruction along with the companion enable bits, as so possibly modified, retrieved from the error register, placing them into the respective pipelines.

The disabled atom is masked and will not be executed. Since the enable bits effectively track the VLIW molecule instruction as it executes, changes made to the enable bits by the exception handlers are cumulative, until the entire molecule instruction (all the atom instructions) completes successfully.

The foregoing and additional objects and advantages of the invention together with the structure characteristic thereof, which was only briefly summarized in the foregoing passages, becomes more apparent to those skilled in the art upon reading the detailed description of a preferred embodiment of the invention, which follows in this specification, taken together with the illustration thereof presented in the accompanying drawings.

DETAILED DESCRIPTION OF THE PREFERRED EMBODIMENT

Figure 1:
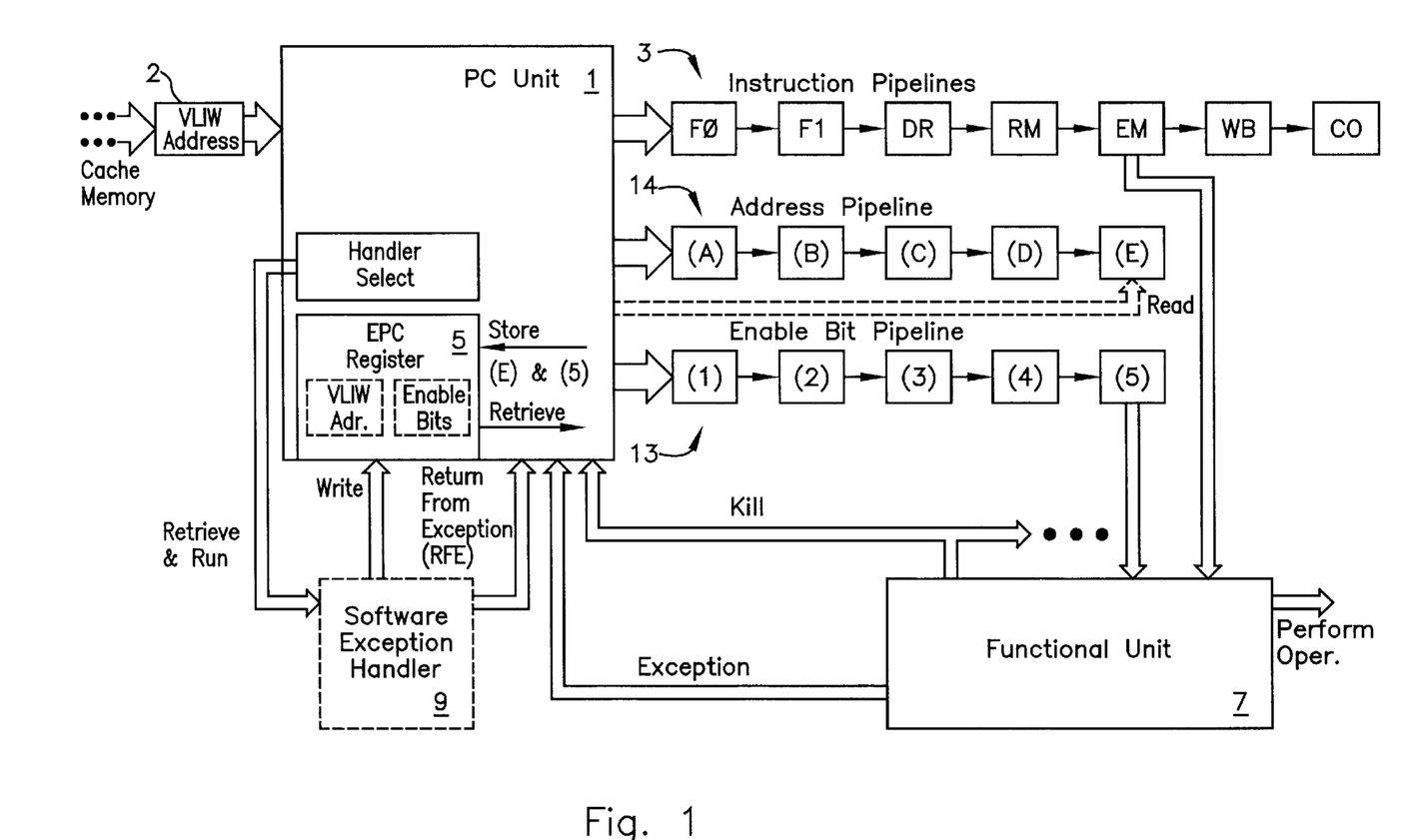
FIG. 1 is a simplified functional block diagram illustrating an embodiment of the invention as applied in a VLIW microprocessor.

Reference is made to FIG. 1 which illustrates the invention in a simplified functional block diagram. The figure is a partial illustration of a VLIW computer, more specifically the microprocessor, presenting only the internal elements thereof that contain or make use of the present improvement. Those elements include the pipeline control (PC) unit 1, a register 5, otherwise referred to herein as the error register, which is contained within PC unit 1 and which may be the EPC register of the processor, the VLIW instruction pipeline 3, an address pipeline 14 and a functional unit 7, the latter being representative of one of the multiple functional units contained inside the microprocessor.

Exception handler 9, a software routine, is representative of a number of known exception handlers employed in the microprocessor to respectively handle a variety of exceptions. An additional pipeline or sideband 13, suitably conventionally constructed of a multi-bit multi-stage shift register, not specifically illustrated, is included. Sideband 13 carries the enable bits referred to in the preceding summary. That sideband pipeline is controlled by PC unit 1, as herein more fully described.

Given a VLIW processor, the enable bit sideband 13, and register 5 should be recognized as being new, and a distinguishing hardware aspect to the invention. As becomes apparent hereafter, the implementation of the invention also requires minor hardware modification to the processor's various functional units, and minor software modification to the associated exception handler as hereinafter more fully described.

Functional unit 7 represents a composite of the individual functional units within the VLIW microprocessor as should suffice to enable understanding of the invention. As example, the VLIW processor known to applicant contains two arithmetic and logic units (ALU0) and (ALU1), a memory unit, a Floating Point Unit (FPU) and a media unit, not separately illustrated in the figure.

Exception handler 9 is also representative of the multiple individual software exception handlers, included in processors. Stored in memory as software routines, the software exception handlers may be called up and executed by the processor's PC control unit 1 when needed. Each exception handler is designed to handle (resolve) a particular type of exception. When needed, a particular handler is selected by the processor's control unit, here PC unit 1, and is executed to take the action that resolves the exception; the routine is advanced through the instruction pipeline 3, instruction by instruction, and is executed.

The VLIW instruction pipeline 3, a composite of the multiple instruction pipelines in the processor, contains five principal stages, designated F0, F1, DR, RM, and EM. Two additional stage designated WB, write-back and CO, commit, are optional, but are desirable operations, such as described, as example, in the particular VLIW processing system described in the '205 Kelly patent, earlier cited. Sometimes the later two optional stages are combined into a single stage of the pipeline. As will be appreciated, their function is not necessary to the understanding of the invention.

Pipeline stage F0 represents the first cycle of the instruction fetch stage and F1 the second cycle of that instruction fetch stage in which the atom instruction is fetched from a memory, the instruction cache, not illustrated; DR represents a decode stage (or, for a different type of atom, a register read); RM represents the register read stage (or, for a different type of atom, a cache 0 stage); and EM represents either the execution stage or a cache 1 stage, a floating point execute, or a media execute stage. EM is the stage in which the functional execution units of the processor compute the instruction results.

As the foregoing implies, the instruction pipeline illustrated actually represents a composite of the several different pipelines in the processor, later more fully described in connection with FIG. 2. As recalled, a VLIW computer is an explicitly parallel structure. The VLIW instructions, called molecules, contain multiple independent operations, that is instructions, that execute in parallel. Each operation such as add, load, branch, shift is specified by an "atom", which has a format that resembles a typical RISC instruction.

In a practical embodiment of the VLIW computer, the VLIW molecule may comprise either sixty-four bits or 128 bits in length. And the molecule may contain between one to four atoms. Examples of these VLIW instructions are contained in Tables 1 and 2. The format of a 128 bit VLIW instruction molecule is described in table 1. That molecule packs four different atoms defining separate operations. Specifically the VLIW instruction calls for a memory operation, an ALU1 operation, an ALU0 operation and an immediate operation. Alternatively any of the remaining operations available in the processor may be substituted for the ALU1 operation in the instruction, excepting an ALU0 or immediate operation. Each of the operations in the VLIW instruction is recognized as requiring service by separate functional units 7 of the processor.

By design, bits 61 and 62 of the foregoing molecule specifies the format number of the molecule and thereby its length in bits. As example these bit positions identify whether the molecule is 128 bits in length or is 64 bits in length (as in Table 2 hereafter) and for the 128 bit molecule, identifies which of the two formats thereof permitted. The latter differ only in whether the operation called for between bit positions 0 and 32 is an immediate 32, as illustrated in Table 1, or is a branch operation. The bit at position 127 is a commit bit (used in connection with the commit operation referred to in the '205 Kelly patent) or may be used for any other purpose desired by the designer or left unused. The bit positions at 125 and 126 within the molecule are free for software use. As those skilled in the art appreciate, the processor contains the conventional decode logic to decode and interpret the foregoing information. Being known and not necessary to an understanding of the invention, that logic need not be further described.

TABLE 1

Format of a 128 bit VLIW instruction

| 127 | 124 | 96 | | | 63 62 61 60 | | | 32 31 | 0 |
|---|---|---|---|---|---|---|---|---|---|
| C | XX | Memory | | 101 | ALU1 | 0 | 00 | ALU0 | Immediate32 |
| 2 | | 29 | 3 | | 29 | | 2 | 29 | 32 |

As in the 128 bit molecule, the 64 bit molecule in Table 2 incorporates up to two separate atoms. As in the larger molecule, bits 61 and 62 in this shorter molecule identify the format, here as a 64 bit instruction; bit 63 is a commit bit; bits 32 through 60 define a memory atom and bits 0 through 28 define an ALU1 operation (atom) or any of the other operations available in the processor, except a memory or ALU0 operation. Each of the atoms in this 64 bit molecule also calls for separate mutually exclusive operations that rely on separate functional units within the processor system. Thus all the atom operations within the molecule may be executed in parallel, since they do not produce a conflict over the available processor resources.

TABLE 2

Format of a 64 bit VLIW instruction

| 63 62 61 60 | | 32 31 29 28 | | 0 |
|---|---|---|---|---|
| C | 01 | Memory | 101 | ALU1 |

Returning to the discussion of the processor pipelines, each atom belongs to an atom type that is based on the processor resources that the atom uses when it executes, such as functional units, data paths and the like. Thus, the composite pipeline illustrated in FIG. 1 represents four different processor pipelines, each, with one exception, being associated with a single functional unit of the processor.

Figure 2:
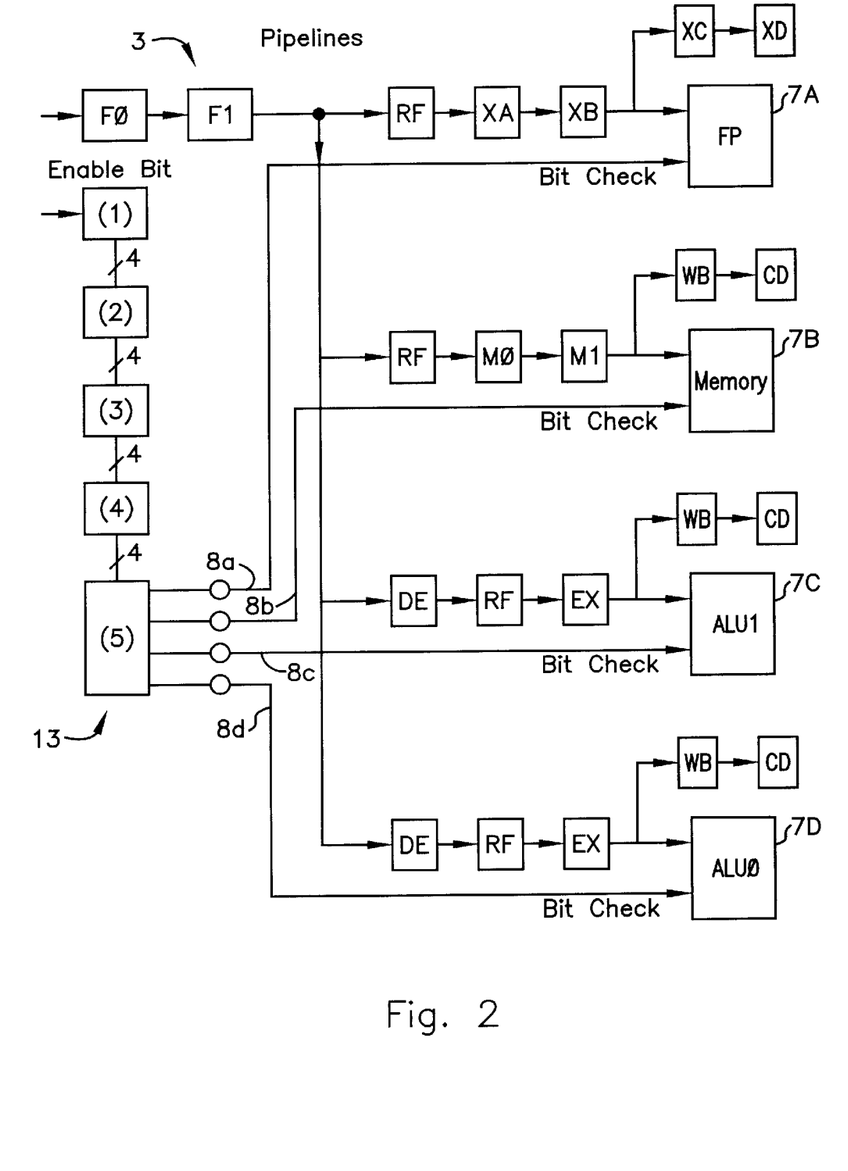
FIG. 2 is a more detailed illustration of a portion of the embodiment of FIG. 1.

The individual pipelines are illustrated symbolically in FIG. 2 to which brief reference is made. Each functional unit 7A, 7B, 7C and 7D is associated with an individual pipeline. One pipeline is associated with the computer's arithmetic and logic unit (ALU0) 7D, another with its second arithmetic and logic unit (ALU1) 7C, another with the computer's memory 7B, and a fourth associated with the Floating Point Unit (FPU) and the processors media units 7A. Typically, the initial two fetch steps are common to all the atoms, hence, the several different pipelines employ the same two stages, which are located within PC unit 1 and diverge to the various functional units 7A–7D following the second stage. The respective functional units perform instruction execution at the fifth stage.

When a molecule containing four independent atoms is entered into a processor instruction pipeline (as an address), the atoms, being directed to different functional units within the processor, are routed into the appropriate pipeline associated with the respective functional unit, 7A–7D. Those separate atoms progress along the respective pipelines, step by step, essentially in tandem. As those skilled in the art appreciate, the atoms within a molecule of necessity must be such as to execute in different functional units, so as to avoid a conflict that shuts down the processor. The instruction format, such as presented in Tables 1 & 2, to which the computer programmer must adhere, insures that atoms in a molecule use distinct functional units.

Returning to FIG. 1, address pipeline 14, also constructed of a multi-stage multi-bit series of registers, is included within PC unit 1. This pipeline contains five stages (A) through (E), paralleling the F0 through EM stages of instruction pipeline 3. The address pipeline carries the VLIW instruction address, step by step, down the pipeline in synchronism with advancement of the VLIW instruction retrieved into the instruction pipeline 14. That movement or transfer of digital address information from one stage to another is controlled by the processors PC unit 1. The address pipeline provides protection against loss of the instruction (molecule). If for any reason an exception occurs in the instruction pipeline that results in the loss of the instruction, the PC unit 1 is able to retrieve the instruction address from the address pipeline and simply retrieve the lost instruction at that address in memory for subsequent reassertion. As becomes apparent, the address pipeline provides a convenient location to access the address instruction required in the operation of the present embodiment in which the instruction address is read from the address pipeline and stored in the error register 5 along with the enable bits linked to the respective instruction.

Enable bit sideband pipeline 13 contains five stages (1) through (5), which, like the address pipeline, parallel the F0 through EM stages of the instruction pipeline. The sideband pipeline is suitably constructed of multi-bit multi-stage registers (i.e., flip-flops), and is operated by the PC unit to step the bits from one stage to succeeding stages, stage by stage, transferring the bits down the line, mimicking the movement of the bits comprising the molecule along the instruction and address pipelines. In this embodiment, four separate bits, corresponding to four distinctive functional units of the processor that execute atoms, are placed in parallel into this sideband pipeline. For this embodiment sideband pipeline 13 thus should be at least four bits wide.

Each of the processor's functional units, as represented by functional unit 7, are connected by separate electrical leads to the associated bit position at stage 5 of enable bit sideband 13, as represented by the arrow, enabling the respective functional unit to monitor (test) the state of the associated one of the four enable bits. As example, the enable bit associated with the processors memory functional unit is extended via a lead to a "bit check" input of the memory functional unit. This is illustrated in FIG. 2, to which reference is again made. As illustrated, address sideband 3 contains four leads extending from stage (5), representing the four enable bits. One of those leads 8A extends to the bit check input of functional unit 7A; lead 8B extends to the corresponding input of unit 7B; lead 8C to the bit check input of unit 7C and lead 8D to unit 7D. The voltage on the respective leads is either a "1" or a "0", and that voltage is checked by the respective functional unit as later herein described.

Figure 3:
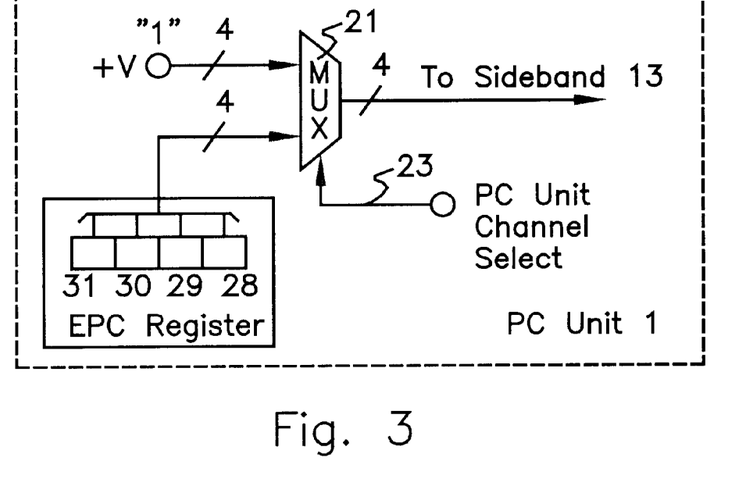
FIG. 3 is a partial illustration of the component used in the embodiment of FIG. 1 to introduce the enable bits.

To introduce the four enable bits within the enable bit pipeline, the PC unit 1 contains a two channel multiplexor (MUX) 21, illustrated in FIG. 3 to which reference is made. The MUX contains two channels, each of which is four bits wide. All four bits of the first channel are electrically tied to a source of voltage +V, which represents a "1". Absent a command from the PC units internal logic at the select input 23, by default the MUX outputs the bits from the first channel, thereby applying those bits to sideband 13. Should the PC unit apply a select voltage at MUX select 23, the MUX instead passes the four bits from the second channel. The four bit lines of the second channel connect to the four bit positions for the enable bits stored in (EPC) error register 5, and are for use on a return from exception condition, later herein described in greater detail.

Error register 5, located in PC unit 1, is either a separate register or a logically isolated portion of another of the pipeline control unit's registers, not otherwise illustrated. The register is provided to store the address of a VLIW instruction and the pipeline enable bits associated with that instruction following occurrence of an exception, as described in the discussion of operation, which follows in this specification. As example, a format of the 32 bit word in register 5 containing the foregoing information is presented as background in Table 3.

TABLE 3

Error register content

| 31 | 30 | 29 | 28 | 27 | 26 | 25 | 24 | 23 | 0 |
|---|---|---|---|---|---|---|---|---|---|
| F | M | A1 | A0 |  |  |  |  | PC | |

The designation PC in table 3, represents the VLIW address information, typically 24 bits wide; the four bit positions between (and including) bits 28–31 are referred to as the enable field. At bit position 31, F represents the Floating Point/media unit (FP) 7A pipeline enable bit; at bit position 30, M represents the memory pipeline (FN2) 7B enable bit; at bit position 29, A1 represents the ALU1 (arithmetic and logic unit 1) pipeline enable bit; and at bit position 28, A0 represents the ALU0 pipeline enable bit. Bit positions 24–27 may remain vacant or may be employed for other operations, not inconsistent with the described operation.

In each instance at the respective bit position of the enable field, a digital "1" represents that the respective operation is enabled, while a digital "0" represents that the respective operation is disabled. When an exception is generated the foregoing enable bits are stored by PC unit 1 in (EPC) error register 5. In the 24 bits between bit positions 0 and 23, the significant part of an instruction address, all but the lower three bits, is stored, when an exception is generated, which is sufficient to enable the processor to locate the VLIW instruction (molecule). Upon return from an exception this information is retrieved by PC unit 1 to reassert the VLIW molecule in instruction pipeline 3 and the linked enable bits into the sideband 13.

The further description of the invention is best understood in connection with the functions required during the operation as part of a VLIW processor, which is next considered. As the foregoing description makes clear, each of the enable bits in the string is associated with a particular one of the processor's execution units, one bit per execution unit, and the enable bit string is effectively attached or annotated to a VLIW molecule. In the shorter molecules containing only two atoms not all of the enable bits in the string will have an atom with which to associate. A designated enable bit (or, alternatively, in another embodiment, the enable bit string) is able to pass along with each atom to the functional unit that is to execute that atom. Each functional unit's decoder is designed to inspect the associated enable bit (or, in the alternative embodiment, inspect the proper enable bit within the string of enable bits) to determine whether the associated atom (instruction) is enabled and execution is to occur. In the aforementioned alternative embodiment, the functional unit also disregards all the other enable bits that are irrelevant to that respective functional unit.

As represented in FIG. 1, during processor operation, pipeline control unit 1 is supplied with a VLIW instruction address 2 of an instruction which the processor is to execute, retrieved from the processor's cache or from memory, not illustrated. PC unit 1 outputs that address into the instruction pipeline 3 and also into address pipeline 14. Being stepped or advanced through instruction pipeline stages F0 and F1, which retrieves the instruction at the specified instruction address, then stage DR, RM and progresses into execution stage, EM, whereby the VLIW instruction is ready for execution by the respective functional units. As earlier described, at this stage each atom instruction is ready for execution in its respective functional unit pipeline, collectively represented by pipeline 3. The PC unit also moves the instruction address along the address pipeline in synchronism with the stage to stage movement of the instruction in the instruction pipeline.

Concurrently and in step with the introduction of the address and instructions into respective address and instruction pipelines, PC unit 1 also enables output from enable bit source MUX 21, illustrated in FIG. 3, to supply the four enable bits into sideband 13. Being the first introduction of the VLIW instruction (molecule) into the instruction pipeline, the PC unit retains MUX 21 in its default state. In that default state, the MUX passes its first input channel to the output. Since all four inputs to that channel are tied to a voltage high positive, a digital "1", the four MUX outputs are digital "1", enabled. Hence, the PC unit automatically enters a set of four "1" bits into the enable bit sideband 13. Those bits constitute the new pipeline enable bits. The digital "1" is the default condition and represents enable. The bit position in the four bit wide string is associated with a respective one of the processor's multiple functional units, as earlier herein described in connection with Table 3.

As PC unit 1 steps (advances) the VLIW instruction (molecule) through the stages of instruction pipeline 3, it also steps the enable bit pipeline 13, advancing the bits introduced therein, to succeeding stages, (1) through (5), in synchronism with the progress of the VLIW instruction (molecule) through the five stages of the instruction pipeline; and, hence with the multiple atoms (instructions) that constitute that VLIW instruction. Effectively, the enable bits track alongside the VLIW instruction (molecule) and may be said to be linked thereto.

Assuming that one of the multiple atoms in the foregoing VLIW instruction is, as example, a memory atom, and that functional unit 7 represents the functional unit for memory operations, the memory atom instruction reaches the execution stage EM of pipeline 3. At that point in its progress the memory atom, and also the remaining atoms in the molecule that passed through the multiple instruction pipelines, are ready to execute.

As in all processors, a short interval of time exists in this execution stage, in which, prior to execution, the functional units make ready for execution. The details of the time interval at this execution stage are not necessary to an understanding of the invention and therefor need not be described in greater detail. It is sufficient to state, that during this interval, the functional units are able to determine before execution of any atom, including the other atoms, which are similarly acted upon by their respective functional units, whether the atom will cause an exception.

Assuming the memory atom for the memory functional unit 7 generates an exception; and, thereby, cannot execute. The functional unit then issues a global kill signal (represented by the outwardly extending arrow in FIG. 1) to all other functional units and to the pipeline control unit 1. That "kill" signal pauses all the functional units in the microprocessor, including the pipeline control unit 1, until the exception is resolved, and empties all instructions from instruction pipeline 3. It pauses all other operations and clears the Memory unit pipeline (separately represented in FIG. 2) and all other pipelines of all pending atoms. Not only does the exception causing memory atom instruction fail to execute, but, since the exception occurred before any execution action by any functional unit was possible, none of the other atom instructions are executed as well.

Functional unit 7 sends the exception to PC unit 1 along with its identity and an identification of the kind of exception which occurred. From that information, the PC unit's decisional logic, represented by the block labeled "Handler Select" in PC unit 1, determines which of the available individual exception handler routines to call up to resolve the exception. Further, responding to the exception signal, PC unit 1 reads the address of the VLIW instruction from stage (E) of address pipeline 14. It also reads the associated enable bits from stage (5) sideband pipeline 13 and writes both the address (address portion) of the VLIW instruction (molecule) and the enable bits associated with that molecule into EPC error register 5. As example, one particular form of this information was earlier presented in Table 3.

The PC unit selects the appropriate exception handler, and retrieves and executes the exception handler routine. For purpose of this description, exception handler 9 in FIG. 1, represents the exception handler selected. The exception handler handles the exception in accordance with that procedure contained in its program, in any available known way, the description of which is not material or necessary to an understanding of the present invention and, hence, need not be described. Once that exception handler completes its task and resolves the exception, the proper course of action, is to require the instruction pipeline control unit to reissue the same VLIW molecule, containing the atom instruction responsible for the exception.

However, assume that exception handler 9 determines that the excepting memory atom should not be executed again when the VLIW molecule, containing that atom, is reasserted in instruction pipeline 3. The exception handler then writes a "0" to the location of the memory enable bit in Error register 5 (located at bit position 30 in the example given), essentially changing the value of that enable bit from "1", enable, to "0", disable. The exception handler then issues the return-from-exception (RFE) instruction to PC unit 1.

Recognizing the RFE signal from the exception handler 9, PC unit 1 retrieves both the address 2 of the VLIW instruction, containing the multiple atoms and the stored enable bits from error register 5, the selected one of those bits associated with the excepting memory atom being now set to disable, back into enable bit sideband 13, and concurrently reasserts the same VLIW instruction address (or, as alternately characterized, the VLIW instruction) into instruction pipeline 3 and that VLIW instruction address into address pipeline 14.

Making brief reference again to FIG. 3, PC unit 1 effects transfer of the modified enable bits from the error register 5 to sideband 13. Recognizing the exception handler's RFE signal, the PC unit 1 supplies a signal to the MUX's channel select input 23, to enable the second channel of MUX 21. Now the MUX passes the enable bits stored in error register 5 through the MUX's second channel, instead of the default values from the MUX's first channel. The string of enable bits is now "1011", instead of the default value "1111".

Returning to FIG. 1, once reasserted, the VLIW instruction, as before, is again stepped through the stages of instruction pipeline 3. All of the atoms again advance into the execution stage EM of the pipeline. Again the companion enable bits are stepped (advanced) within sideband 13, through stages (1) through (5) in synchronism with the progress of the VLIW instruction address (VLIW instruction) through the five stages of the instruction pipeline 3 and in like synchronism with the VLIW instruction address advance through steps (A) through (E) of address pipeline 14.

It should be recognized that other actions are also occurring in the processor, but are not material to an understanding of the invention. As example, the address of a succeeding VLIW instruction is derived by the PC unit from the address of the preceding one using conventional pipelining technique and the succeeding VLIW instructions address (and the accompanying enable bits for that instruction) is loaded into the respective pipelines in the next cycle to follow in the pipeline behind the VLIW instruction being reasserted, a procedure which continues so as to fill the pipeline with instructions in accordance with standard pipelining technique to maximize the processor's efficiency of execution.

The memory atom and the other atoms in the reasserted molecule are now positioned for execution at their respective function units, as best illustrated in FIG. 2. Each functional unit's decoder checks and interprets the enable bit associated with the respective atom. The decoder for Memory Unit 7B, in addition to its conventional decoding function, decodes the memory enable bit from the parallel bit string in sideband 13, prior to performing the memory atom execution.

Figure 4:
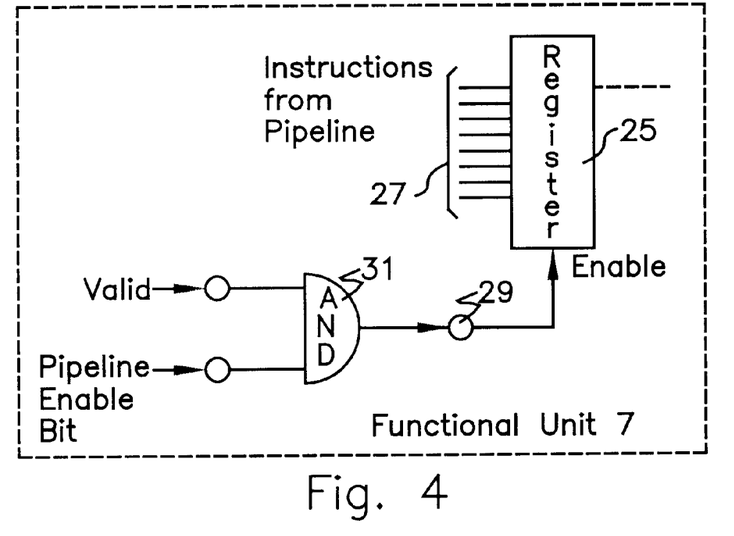
FIG. 4 is a partial illustration of the microprocessor functional unit's component used in the embodiment of FIG. 1 that checks an associated enable bit to determine whether to execute an operation.

As illustrated in FIG. 4, to which reference is made, the functional units internal register 25 receives inputs 27, partially illustrated, from the instruction pipeline. However to register the bits of the atom within the internal register, the internal register must first receive an enable signal at its enable input 29. The enable bit may be connected to that enable input so as to enable the register only when the bit is a "1". However, in this preferred embodiment, the functional unit is also modified to include a dual input AND gate 31, the output of which connects to the internal registers enable input. The two gate inputs are connected respectively to the enable bit, and to any other bit source intended as a pre-condition to execution of the atom instruction. As example, it is typical to employ an instruction "valid" signal in the operation of the processor before the functional unit is able to execute the instruction. Thus both gate inputs to AND gate 31 must be set enabled before the functional unit's internal register will register the atomic instruction for execution.

Returning to FIG. 2, assuming a valid instruction, if the memory enable bit is set "1", the memory unit's operation for the instruction, namely the memory atom of the VLIW instruction molecule specified in bit positions 96 to 124 in table 1, continues and executes. If, however, the bit is set to "0", the memory operation prescribed in the memory atom is masked, and will not be executed by the memory functional unit 7B.

Likewise, the arithmetic and logic unit ALU0 7D is designed to examine the enable bit associated with the unit before continuing with decoding the instruction/operation presented it at other inputs. Again, if that bit is set to enable, the ALU0 operation prescribed in the atom at bit positions 32 to 60 in the VLIW instruction format illustrated in table 1 is executed. Otherwise, the prescribed atom operation will not occur. The same procedure is employed by the decoders associated with ALU1, and the Floating Point unit.

When all the atoms are advanced into the execution stage EM of the respective instruction pipelines, all of the atoms in the molecule execute, except the atom for the memory operation, which the memory unit's decoder detects as disabled ("0"). Accordingly, all the remaining atoms in the molecule are executed as required for operation of the program.

The foregoing description of operation assumes that none of the remaining atoms generate an exception when being executed. However, it is possible for another atom in the molecule to generate an exception as well. To that end, it is next assumed that in the VLIW molecule's second trip down the instruction pipeline, the arithmetic & logic unit (ALU0) atom, just prior to its potential execution, generates an exception.

Reference is again made to FIG. 1. Assume that functional unit 7 in FIG. 1 represents the ALU0 unit. The functional unit issues a global kill command to all functional units and the PC unit, which pauses all other operations and clears the ALU0 instruction pipeline and all the other like pipelines of all instructions, and sends an exception signal to the PC unit 1 and along therewith its identity and an identification of the kind of exception which occurred. Responding to the exception signal, the PC unit reads the address of the VLIW instruction from stage (E) of the address pipeline and the associated enable bits from stage (5) of the enable bit pipeline and writes that address and the enable bits associated therewith into EPC error register 5.

PC unit 1 again evaluates the exception, selects the appropriate exception handler, which is likely a different one than before, and retrieves and executes the exception handler routine. For purpose of this discussion, exception handler 9 in FIG. 1, represents this selected handler. The exception handler then handles the exception in accordance with the instructions comprising the software routine, the description of which is not material or necessary to an understanding of the present invention and, hence, need not be described.

Assume the exception handler in this instance proscribes execution of the excepting atom when the molecule is reasserted in the instruction pipeline. Upon completion of its task in handling the exception, the exception handler writes a "0" to the ALU0 unit's enable bit in Error register 5 (located at bit position 28 in the example described in connection with Table 3), thereby changing the bit value stored in that location in the enable field from "1" (enable) to "0" (disable). The enable bit string is now "1010".

Having completed its tasks the exception handler issues a RFE return from exception instruction to the PC unit 1. In response, recognizing the RFE signal from the exception handler 9, PC unit 1 retrieves both the address 2 of the VLIW instruction, containing the multiple atoms, and the string of enable bits from (EPC) error register 5, reasserts the instruction address into pipeline 3, effectively reasserting the VLIW instruction (molecule) and into address pipeline 13. The PC unit also asserts the retrieved enable bits into sideband 13, the selected one of those bits also now being set to disable for a total of two disabled bits.

The VLIW instruction then passes through instruction pipeline 3, again accompanied by the enable bits in sideband 13 and by the address in address pipeline 14. However at this stage the enable bits of both the memory operation atom and the ALU0 operation atom are now set to disable and can no longer generate an exception. When all the atoms are at the execution stage, all of the atoms in the molecule execute, except the atoms for the memory operation and the ALU0 operation. Accordingly, all the remaining atoms in the molecule are executed in their respective functional units as required for operation of the application program being run on the VLIW computer.

The foregoing description assumes that the two remaining atoms in the VLIW molecule, comprising four atoms, will execute. If not, the foregoing procedure repeats for any or all of the atoms that fail to execute and generate an exception.

From the preceding description, it should be understood that each time the accompanying enable bits are stored in the Error register 5, they are stored in their current state. That is, if a bit associated with a functional unit is marked enabled or disabled, it remains so marked. If two separate bits are marked disabled at that time they remain so marked when placed in the Error register. Subsequent exception handlers arising during execution of remaining atoms in the molecule may mark still another one of the enable bits as disabled.

The changes made to the string of enable bits are cumulative. They remain effectively attached or linked to the molecule, and effectively travel along the pipeline or sideband in tandem with the molecule as the latter is stepped along the instruction pipeline. Once the entire molecule has been executed or otherwise disposed of during operation, the associated enable bits are no longer needed and effectively disappear.

The foregoing provides a unique and effective structure and operation for disabling atom instructions within a molecule that does not intolerably slow processing. As one skilled in the art appreciates from the foregoing description, implementation of the invention requires minor structural modification to a VLIW processor in accordance with the directions given in the preceding description of the invention and its operation. Such modification is required of the VLIW processors pipeline control (PC) unit and to the functional unit. The invention further requires incorporation of an additional sideband pipeline and modification of the processors address pipeline or the addition of an additional address pipeline. It also requires minor modification to a small number of some existing exception handling software, such as the addition of the steps to write to a bit position in the error register before returning from exception when modification of the enable bit is desired. Most of the exception handlers used in the VLIW processor should not modify the enable bits at all, and will not require any change.

Upon reading this specification, those skilled in the art will realize that the foregoing invention has greater application than presented in the illustrated embodiment. The enable bit sideline is a control information pipeline and may be expanded to carry additional digital bits or other control information linked to a VLIW molecule. Those additional bits need not be associated with individual atom instructions, as in the foregoing embodiment, and may serve other control purposes, all of which comes within the scope of the present invention.

Further, it is also possible to expand the sideband to carry additional digital bits linked to a VLIW molecule and to associate one of those digital bits with one of the atom instructions within the molecule to serve a control purpose for that atom instruction. Moreover, additional control bits may be included in the sideband to suppress some side effects attendant to execution of an atom, such as whether a load actually reads memory, whether an ALU operation sets condition codes or sets the destination register, and the like. All of the foregoing is believed to come within the scope of the present invention.

The control information sideband or pipeline was described as being physically separate from the instruction pipeline. However, as recognized from an understanding of the invention, physical separation in hardware is not required to practice the invention. It should be realized that the foregoing sideband may be integrated within the instruction pipeline to define a new or expanded instruction pipeline, which is equivalent in all respects to the separate pipelines described in the illustrated embodiment. An instruction pipeline contains a series of registers that are used to hold instruction information at each stage of the pipeline; and that information is transferred from one register to a succeeding register. By employing larger registers, if available, in that instruction pipeline, large enough to accommodate, as an example, the additional enable bits, those enable bits can be placed within and moved along the pipeline in synchronism with the instruction just as when separate hardware is used. It should thus be understood that the invention does not require separate hardware for the individual pipelines.

One recognizes that some portions of the foregoing detailed description was presented in terms of symbolic representations of operations on data bits within a computer. Those descriptions and representations are the means used by those skilled in the data processing arts to most effectively convey the substance of their work to others skilled in the art. The operations are those requiring physical manipulations of physical quantities. Usually, though not necessarily, those quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and were merely convenient labels applied to these quantities.

Further, the manipulations performed were often referred to in terms, such as interpreting, determining, reading and writing, which are commonly associated with mental operations and actions performed by a human. No such capability of a human operator is intended or desirable in any of the operations that were described herein, which form part of the present invention. The operations are machine operations. Useful machines for performing the operations of the present invention include general purpose digital VLIW computers or other similar devices. In all cases the distinction between the method operations in operating a computer and the method of computation itself should be borne in mind. As those skilled in the art recognize the present invention related to a method and apparatus for operating a computer in processing electrical or other (e.g. mechanical, chemical) physical signals to generate other desired physical signals.

One particular aspect of terminology is worthy of mention as should assist those less skilled in the art to interpret the claims which follow. When a person skilled in the computer art states that the processor's control unit asserts an instruction within the processor's instruction pipeline, what actually takes place is that the control unit places the address of the desired instruction into the pipeline. The first and second stages of the pipeline, the fetch stages, use that address to retrieve the instruction from memory and apply the instruction to the succeeding stages of the pipeline, which ultimately leads to the pipeline's execution stage in which the instruction is executed. In that context, a statement that a processor unit is placing or asserting an instruction into the pipeline is synonymous with placing the instruction address into the instruction pipeline.

It is believed that the foregoing description of the preferred embodiments of the invention is sufficient in detail to enable one skilled in s the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a VLIW processor for executing VLIW instructions, said processor including a plurality of different functional execution units;
   a source of VLIW instructions, each said instruction comprising a plurality of different atom instructions;
   each of said atom instructions defining a processor operation executed by a different one of said plurality of different functional execution units, whereby each said atom instruction is associated with a respective functional execution;
   a source of digital bits, said source for providing a group of digital bits for each VLIW instruction, said group of digital bits defining enable bits;
   each of said enable bits corresponding to a respective one of said functional execution units, wherein for every atom instruction in said VLIW instruction a bit is present in said group of enable bits that is associated with the same functional execution unit as said respective atom instruction;
   linking means for linking said group of enable bits to a respective VLIW instruction for synchronous movement with said VLIW instruction, wherein said atom instructions are advanced in parallel to respective ones of said plurality of functional execution units and wherein said enable bit associated with each of said atom instructions is advanced to the same functional execution unit as the associated atom; and
   enable bit checking means at each of said functional execution units for preventing execution of a respective atom instruction presented at a functional unit for execution when the associated enable bit is disabled.

2. The invention as defined in claim 1, further comprising:
   exception handler means for resolving an exception caused by an atom instruction and for changing the enable bit associated with said atom instruction from the enable state to the disable state.

3. The invention as defined in claim 1, further comprising:
   error register means for storing an address of a VLIW instruction together with the group of enable bits linked to said VLIW instruction;
   a plurality of exception handler means;
   each of said plurality of exception handler means for resolving a particular exception raised by an atom instruction, and at least some of said exception handler means including means for changing the state of an enable bit linked to said atom instruction from the enable state to the disable state within said error register means;
   control means, responsive to an exception caused by an atom instruction, for storing the address of said VLIW instruction and said group of enable bits linked to said VLIW instruction within said error register means, and for selecting one of said plurality of exception handler means to resolve said exception;
   said control means being responsive to said exception handler means resolution of said exception for retrieving said address of said VLIW instruction and said linked enable bits from said error register and asserting said retrieved VLIW instruction for execution together with said retrieved linked enable bits.

4. The invention as defined in claim 3, further comprising:
   an address pipeline for receiving a VLIW instruction address, said address pipeline comprising multiple stages; and
   wherein said linking means includes:
      an instruction pipeline for receiving VLIW instructions and conveying atoms contained within said VLIW instructions to multiple functional execution units for execution, said instruction pipeline comprising multiple stages;
      an enable bit pipeline for receiving said enable bits and conveying said enable bits to associated ones of said functional execution units, said enable bit pipeline comprising multiple stages; and
      wherein said control means further controlling advancement of said enable bits through said multiple stages of said enable bit pipeline with advancement of said VLIW instruction through said instruction pipeline.

5. The invention as defined in claim 4, wherein each of said functional units further includes:
   kill signal generating means for generating a kill signal to stall said plurality of functional execution units and clear all VLIW instructions from said instruction pipeline, responsive to the respective atom instruction being determined to be subject to an exception by a respective functional execution unit when said atom instruction is presented thereto for execution, and for providing exception identifying information to said control means; and
   wherein said control means further includes:
      means for detecting said kill signal to respond to said exception and for interpreting said exception identifying information in selecting said one of said plurality of exception handler means.

6. The invention as defined in claim 3, further comprising:
   an instruction pipeline, said pipeline including multiple stages and an execution stage; and
   wherein said linking means further comprises:
      an enable bit pipeline, said enable bit pipeline comprising a multi-bit multi-stage pipeline; and
      wherein said control means further comprises:
         a pipeline control unit for sending a VLIW instruction address into said instruction pipeline and for concurrently sending said linked enable bits into said enable bit pipeline, wherein said linked enable bits advance along said enable bit pipeline in synchronism with advance of said VLIW instruction address and the VLIW instruction substituted therefor within said instruction pipeline.

7. In a microprocessor, a combination comprising:
   a pipeline control unit, said pipeline control unit including a source of enable bits, each of said enable bits having an enable state and a disable state;
   an instruction pipeline containing multiple stages, including an execution stage;
   an enable bit pipeline containing multiple stages;
   said pipeline control unit for supplying an instruction into said instruction pipeline and concurrently supplying enable bits to said enable bit pipeline;
   said enable bit pipeline being synchronized with said instruction pipeline, wherein said enable bits advance through the stages of said enable bit pipeline in tandem with advancement of said instruction through the stages of said instruction pipeline, whereby said enable bits are linked to said instruction;

wherein prior to execution of said instruction an enable bit linked to said instruction is checked within a functional unit associated with said execution stage.

8. The invention as defined in claim 7, further comprising:

means for preventing execution of said instruction when said enable bit is set to the disable state.

9. The invention as defined in claim 8, wherein said enable bits are set to the enable state upon initially supplying an instruction into said instruction pipeline.

10. The invention as defined in claim 9, wherein said pipeline control unit includes:

an error register for storing an instruction address and said enable bits for said instruction;

means responsive to generation of an exception by an instruction for storing the address of said instruction and said enable bits for said instruction in said error register;

software exception handler means for resolving an exception generated by an instruction, said exception handler means for changing an enable bit stored in said error register from the enable state to the disable state.

11. The invention as defined in claim 10, wherein said pipeline control unit further comprises:

means for retrieving each of said instruction address and said enable bits from said error register and applying said retrieved instruction address and enable bits to said pipeline control unit for reassertion into the respective instruction pipeline and enable bit pipeline.

12. The method of preventing re-execution of an atom instruction that caused an exception during the execution of a VLIW instruction molecule upon reassertion of said VLIW instruction molecule in an execution pipeline, said VLIW instruction molecule including multiple distinct atom instructions and said execution pipeline comprising multiple distinct pipelines associated with separate functional units for execution of multiple distinct atom instructions in parallel, comprising the steps of:

providing a helper bit for each atom instruction, said helper bit having an enable state and a disable state, and moving helper bits for said atom instructions in parallel with said VLIW instruction molecule as said VLIW instruction molecule moves through a respective one of said multiple execution pipelines;

storing said VLIW instruction molecule and said helper bits when an excepting atom instruction causes an exception;

changing the state of a helper bit associated with said excepting atom instruction from enable to disable;

reasserting said VLIW instruction molecule into said-respective execution pipeline with said helper bit associated with said excepting atom instruction disabled; and checking the state of said helper bit in a functional unit that is for executing said excepting atom instruction, whereby those atom instructions packed within said VLIW instruction molecule that have an associated helper bit disabled cannot be executed.

13. A VLIW processor for processing VLIW instructions, comprising:

a source of VLIW instructions, each said VLIW instruction comprising a plurality of distinct atom instructions defining distinct operations;

a plurality of distinct functional units, each of said functional units for executing different operations;

an instruction pipeline for receiving VLIW instructions and advancing individual atoms contained therein in parallel to respective ones of said functional units for execution;

a source of control information for each VLIW instruction that is inputted into said instruction pipeline, wherein said control information comprises a plurality of control bits, each of said control bits being associated with a respective one of said functional units, and wherein each functional unit further comprises means for checking the state of the associated control bit prior to executing an operation called for by an atom instruction present for execution to ensure that said control bit is set as a condition to execution;

a control information pipeline;

said control information pipeline for receiving said control information pertaining to an associated VLIW instruction;

a control unit for inputting VLIW instructions into said instruction pipeline and for concurrently inputting said control information for said VLIW instruction into said control information pipeline;

said instruction pipeline and said control information pipeline being operating in synchronism with one another for advancing said control information through said control pipeline in synchronism with advancement of said instruction through said instruction pipeline to link said control information to said instruction.

14. The invention as defined in claim 13, wherein said source of control information sets all said control bits, prior to any of said atoms being found subject to an exception, and providing a control bit associated with a respective atom disabled for any atom determined to have been subject to an exception.

15. A VLIW microprocessor for processing a VLIW instruction, said VLIW instruction comprising a plurality of individual atom instructions, comprising:

a plurality of functional units, said functional units including a floating-point/media unit, a memory unit, an arithmetic & logic unit 1, and an arithmetic & logic unit 0;

a VLIW instruction execution pipeline for execution of a VLIW instruction;

said VLIW instruction including a plurality of atom instructions, distinct from one another, and defining distinct operations required of separate ones of any of said floating-point/media unit, said memory unit, said an arithmetic & logic unit 1 pipeline, and said arithmetic & logic unit 0;

said VLIW instruction execution pipeline further comprising:

a floating-point/media pipeline, a memory pipeline, an arithmetic & logic unit 1 pipeline, and an arithmetic & logic unit 0 pipeline;

said VLIW instruction execution pipeline including first through fourth stages through which said VLIW instruction is advanced for execution, and a fifth stage in which said VLIW instruction is executed;

an address pipeline for receiving a VLIW instruction address from said pipeline control unit when said control unit sends a VLIW instruction address to said instruction execution pipeline, said VLIW instruction address being advanced in said address pipeline in synchronism with said VLIW instruction in said instruction execution pipeline, whereby the VLIW instruction is saved until execution of the respective VLIW instruction;

a pipeline control unit for said VLIW execution pipeline and said address pipeline, said pipeline control unit for retrieving a VLIW instruction address and issuing said VLIW instruction into said execution pipeline, whereby said VLIW instruction address is advanced into said pipeline and is replaced therein by a VLIW instruction which is further advanced through said pipeline for execution, and for concurrently issuing said VLIW instruction address into said address pipeline;

said pipeline control unit further comprising:

a bit source of a plurality of digital bits, each of said plurality of digital bits from said bit source being set in said first enable state;

said plurality of digital bits including a first bit for association with said floating-point/media pipeline, a second bit for association with said memory pipeline, a third bit for association with said arithmetic & logic unit 1 pipeline, and a fourth bit for association with said arithmetic & logic unit 0 pipeline;

a sideline path for passage of said plurality of digital bits;

said sideline path comprising a multi-stage path, the number of stages in said multi-stage path corresponding in number to said first through fifth stages of said VLIW instruction execution pipeline;

means for advancing the position of said plurality of digital bits issued into said sideline path in parallel through said sideline path in synchronism with the advance of said VLIW instruction through said instruction pipeline;

bit retrieving means for retrieving said plurality of digital bits from each said bit source;

each of said functional units, responsive to an exception created by an atom instruction presented for execution thereto from a respective one of said functional unit pipelines, for generating a global kill signal to empty said execution pipeline of said VLIW instruction, whereby said VLIW instruction, including the atom instructions therein, are not executed, and to cause all other functional units to halt, and to signal said pipeline control means of the nature of the exception;

said exception created by an atom instruction presented for execution to a respective one of said functional unit pipelines defining an excepted atom;

an error register;

said error register for storing an address of a VLIW instruction accompanied by said plurality of digital bits;

a plurality of software exception handlers for handling a variety of exceptions created by an atom instruction in any of said functional units;

said pipeline control unit for retrieving said VLIW instruction address from said address pipeline and said plurality of digital bits from said sideline path and storing that address and those bits in said error register, responsive to receiving a global kill signal and an exception signal from any of said functional units, and for selecting one of said plurality of software exception handlers, responsive to said nature of said exception;

said selected one of said plurality of software exception handlers for changing the state of the one of said plurality of digital bits associated with said excepted atom instruction within said error register from the first enable state to a second disable state when the respective exception handler determines that said excepted atom instruction in said VLIW instruction is not to be executed;

said pipeline control unit further comprising means, responsive to said selected one of said plurality of software exception handlers completion in handling said exception, for retrieving said address of said VLIW instruction and enabling said bit retrieving means to retrieve said plurality of digital bits from said error register and concurrently applying said VLIW instruction address to said pipeline control unit to assert said retrieved VLIW instruction address in said instruction pipeline, whereby said VLIW instruction is again placed into said instruction pipeline, and applying said retrieved plurality of digital bits into said sideline path;

said pipeline control unit for normally enabling said bit retrieving means to select said plurality of said bits from said bit source, and, responsive to said selected one of said plurality of software exception handlers completion in handling said exception, for enabling said bit retrieving means to retrieve said plurality of digital bits from said error register;

each of said functional units further including:

decoding means for determining the state of the associated one of said plurality of digital bits associated with said respective pipeline and preventing execution of said atom instruction when said one digital bit is in said second disable state, whereby said excepted atom instruction cannot be executed when said VLIW instruction is again issued into said instruction execution pipeline.

* * * * *